United States Patent [19]

Itagaki

[11] Patent Number: 5,153,929
[45] Date of Patent: Oct. 6, 1992

[54] IMAGE READING APPARATUS OUTPUTTING CORRECTED IMAGE SIGNALS

[75] Inventor: Hiroshi Itagaki, Tokyo, Japan

[73] Assignee: Canon Kabushiki Kaisha, Tokyo, Japan

[21] Appl. No.: 677,502

[22] Filed: Mar. 29, 1991

[30] Foreign Application Priority Data

Mar. 31, 1990 [JP] Japan .................... 2-85745

[51] Int. Cl.$^5$ ............................... G06K 9/20
[52] U.S. Cl. .................. 382/65; 359/213.19; 387/58; 387/67
[58] Field of Search ............ 382/67, 65, 58, 59, 382/; 250/200, 206, 216, 227.2; 358/213.15, 213.16, 213.17, 213.19

[56] References Cited

U.S. PATENT DOCUMENTS

| | | | |
|---|---|---|---|
| 3,962,681 | 6/1976 | Requa et al. | 382/67 |
| 4,143,358 | 3/1979 | Neff | 382/59 |
| 4,147,928 | 4/1979 | Crean et al. | 382/67 |
| 4,318,082 | 3/1982 | King | 382/67 |
| 4,356,513 | 10/1982 | Yoshimura et al. | 382/67 |
| 4,592,090 | 5/1986 | Curl et al. | 382/67 |
| 4,833,724 | 5/1989 | Goel | 382/65 |
| 4,862,512 | 8/1989 | Hidaka et al. | 382/67 |

*Primary Examiner*—Joseph Mancuso
*Attorney, Agent, or Firm*—Fitzpatrick, Cella, Harper & Scinto

[57] ABSTRACT

Image reading apparatus outputting corrected image signals includes at least one linear sensor for reading an image of an original. The linear sensor has a plurality of photodiodes and a transfer shift register. The shift register outputs image signals from a portion thereof connected to a plurality of photodiodes and outputs a dummy signal from a portion thereof unconnected to the plurality of photodiodes. A detecting circuit detects a level of the dummy signal output from the linear sensor, and a control circuit controls a level of the image signal output from the linear sensor in accordance with the level of the dummy signal detected by the detecting circuit.

14 Claims, 11 Drawing Sheets

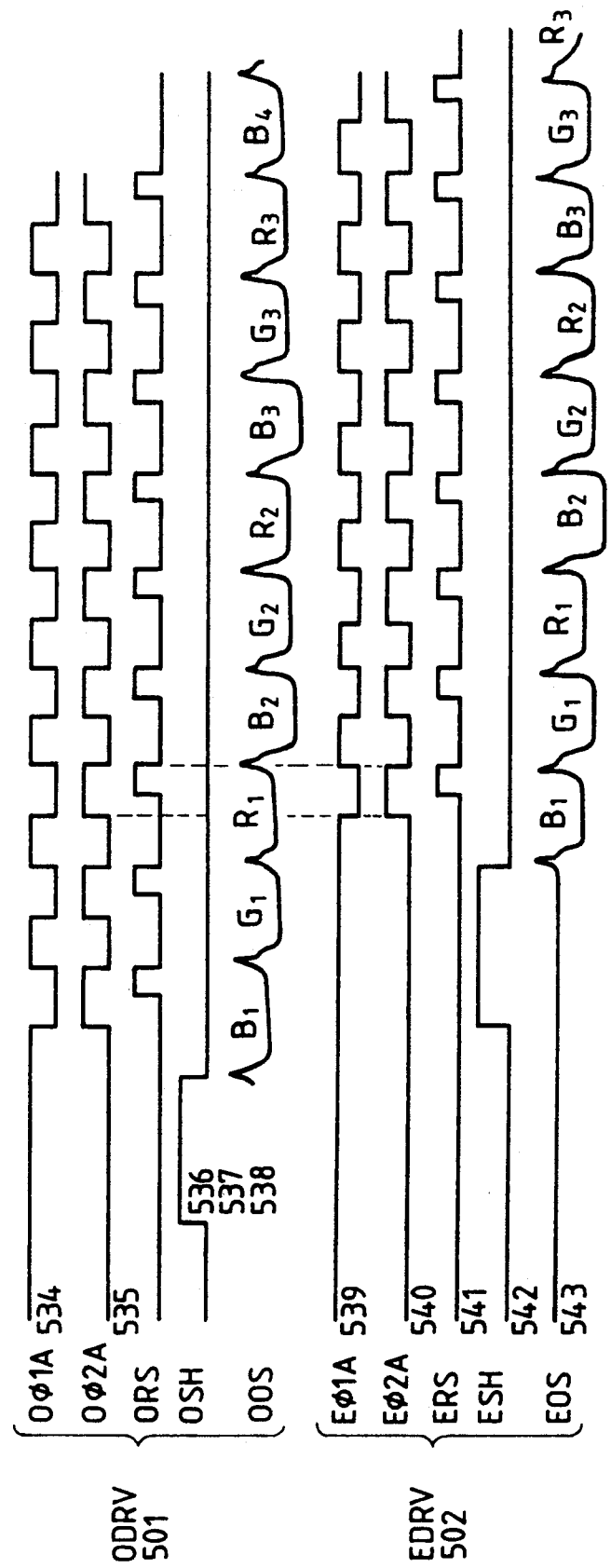

| DIGITAL INPUT N | ANALOG OUTPUT |
|---|---|
| MSB        LSB<br>1 1 1 1 1 1 1 1 | $+\frac{R3}{2R}\left(\frac{127}{128}\right)V_{IN}$ |
| 1 0 0 0 0 0 0 1 | $+\frac{R3}{2R}\left(\frac{1}{128}\right)V_{IN}$ |
| 1 0 0 0 0 0 0 0 | 0 |
| 0 1 1 1 1 1 1 1 | $-\frac{R3}{2R}\left(\frac{1}{128}\right)V_{IN}$ |
| 0 0 0 0 0 0 0 1 | $-\frac{R3}{2R}\left(\frac{127}{128}\right)V_{IN}$ |
| 0 0 0 0 0 0 0 0 | $-\frac{R3}{2R}\left(\frac{128}{128}\right)V_{IN}$ |

IMAGE READING APPARATUS OUTPUTTING CORRECTED IMAGE SIGNALS

BACKGROUND OF THE INVENTION

1. Filed of the Invention

The present invention relates to an image reader for reading an image using a plurality of image sensors.

2. Related Background Art

As an image sensor which has been conventionally used to read an image, an image sensor, in which linear image sensors are provided with a stripe type of color filter and a color separation signal is time-shared to be dot-sequentially read, has been known.

When reading an original, for example, a size A4 297 mm in longitudinal width, a silicon crystal type of image sensor is suitable to read at high speeds. In the case of the silicon crystal type image sensor, however, it is difficult to manufacture a longitudinal type sensor with one chip because of some restrictions in the manufacture, and therefore, a linear sensor is composed of a plurality of chips by exerting ingenuity in the physical placement.

FIG. 9 is a schematic diagram showing the light receiving surface of an image sensor in which linear sensor chips 100 to 104 are arranged in zigzag fashion on a substrate 105. In the linear sensor chips 100 to 104, a plurality of light receiving elements consisting of amorphous silicon, etc. have been lined up. In FIG. 9, each linear sensor chip, 100 to 104, is scanned in the arrow MS direction, and outputs an analog signal, which is synchronized with a specified clock pulse and corresponds to the intensity of the received light, to an output, OUT, for each pixel.

Also, on actually reading an original image, this multi-chip CCD sensor travels relative to the original in a direction (arrow SS direction) perpendicular to the main scanning direction of the linear sensor. Accordingly, the linear sensor chips 101 and 103 read and scan the original a specified line ahead of the linear sensor chips 100, 102 and 104.

FIG. 10 shows an example of a configuration of an original reader using an image sensor shown in FIG. 9, and numeral 207 is an image sensor shown in FIG. 9. In FIG. 10, numeral 218 is an original having an image to be read, numeral 220 is an irradiation lamp, numeral 221 is a reflective mirror, numeral 217 is an original loading glass (an original loading stand), numeral 202 is a standard plate providing a reference level for a read signal, and numeral 223 is a rod lens array for focusing reflecting light from an original 218 placed on the original loading glass 217 onto the image sensor 207. A scanning unit 210 is mounted with sliding members 203 and 204 at the bottom, which slide on the surface of two rails 201.

A wire 215 drives the scanning unit 210, and is secured to members provided on both sides of the scanning unit 210 with fitments. A pulley 211 drives the wire 215, and is secured to a shaft 225. An idle pulley 214 forms a counterpart to the pulley 211, and is pulled by a spring 236 in such a direction as to apply a tension to a driving wire 215. Numeral 227 is a motor, numeral 212 is a motor pulley, and a belt 213 transmits a rotary motion of a motor pulley 212 to the pulley 211.

Numeral 243 is a CCD driver and amplifier circuit, and a signal line 241 transmits a signal from the image sensor 207 to the amplifier circuit 243. A processing unit 216 performs the functions of memory, operation, output, etc., and a signal line 242 transmits a signal from an amplifier circuit 243 to the processing unit 216.

A rotary motion of the motor 227 is converted to a linear motion of the scanning unit 210 through the motor pulley 212, the belt 213, the pulley 211 and the wire 215. The scanning unit 210 slides (reciprocates) on the surface of the rails 201 in the arrow direction in FIG. 10 through sliding members 203 and 204 by forward or reverse rotations of the motor 227. At this time, irradiation lamp 220, reflective mirror 221, rod lens array 223, image sensor 207, signal line 241, and CCD driver and amplifier circuit 243 perform the same motion as the scanning unit 210 because all of them are mounted on the scanning unit 210.

The original 218 is irradiated by the irradiation lamp 220, and its reflected light is image-formed on the image sensor 207 through the rod lens array 223. The image sensor 207 outputs an analog signal corresponding to this image-formed image. The analog signal is transmitted to the amplifier circuit 243 through the signal line 241, and is transmitted to the processing unit 216 through the signal line 242 after it is converted into a specified level of analog signal by the amplifier circuit 243.

The moment it scans the original for each line as mentioned above, the scanning unit 210 travels (subscans) in the arrow ss direction in FIG. 10 to scan the entire desired area of the original.

In the above-mentioned configuration, the temperature at the image sensor 207 rises due to heat generation in the image sensor itself because the load capacity of the image sensor 207 is great during driving and the driving frequency therefor should be made higher to read at high speeds. In addition, since such heat release elements as the irradiation lamp 220, the CCD driver and amplifier circuit 243 are located near the image sensor 207, the temperature at the image sensor 207 also rises due to their heat generation.

Such a rise in temperature of the image sensor 207 causes fluctuations in the output level of the image sensor 207, and specially a change in dark current in the image sensor 207.

Even in the circuit unit of the processing unit 216 for processing an output signal from the image sensor 207, fluctuations in the level of the processing output signal occur for various reasons such as environmental temperature and variations with time.

To eliminate the effects of the change in dark current due to a rise in temperature of the image sensor 207 and variations in the level of a dark output unit due to the circuit configuration and the like, a clamping circuit was provided which detects the signal level of the dark output unit of the image sensor 207 once per horizontal scan to direct-current restore the detected signal level at a specified potential.

However, the reflected light leaks from the edge of the cut area of the image sensor chip into the dark output unit in the image sensor to change the level. In the clamping circuit, there was an inconvenience that the significant image level relatively changes because the dark output unit, in which the level has changed, is fixed to a specified potential.

Also, in a configuration in which an image is read using a plurality of sensor chips as shown in FIGS. 9 and 10 mentioned above, when a bright light corresponding to white in an original image comes to an area corresponding to the dark output unit of a chip having the image sensor 207, there was a defect that the density changes in the horizontal scanning direction, and a difference in density level occurs between each image corresponding to each chip.

SUMMARY OF THE INVENTION

Thus, it is an object of the present invention to provide an image reader capable of always outputting an image read output signal at a proper level.

It is a further object of the present invention to provide an image reader capable of reading well an image without causing any gap, etc. in the output between each image sensor using a plurality of image sensors.

It is also an object of the present invention to provide an image reader capable of outputting a color image as an image signal at a proper level.

The above-mentioned objects and other objects and effects of the present invention will appear more fully from the following description.

BRIEF DESCRIPTION OF THE DRAWINGS

FIG. 2B is a timing chart showing timing of signals from each portion shown in FIG. 2A.

DESCRIPTION OF THE PREFERRED EMBODIMENTS

An image reader according to an embodiment of the present invention will hereinafter described in detail with respect to the drawings.

Figure 1:
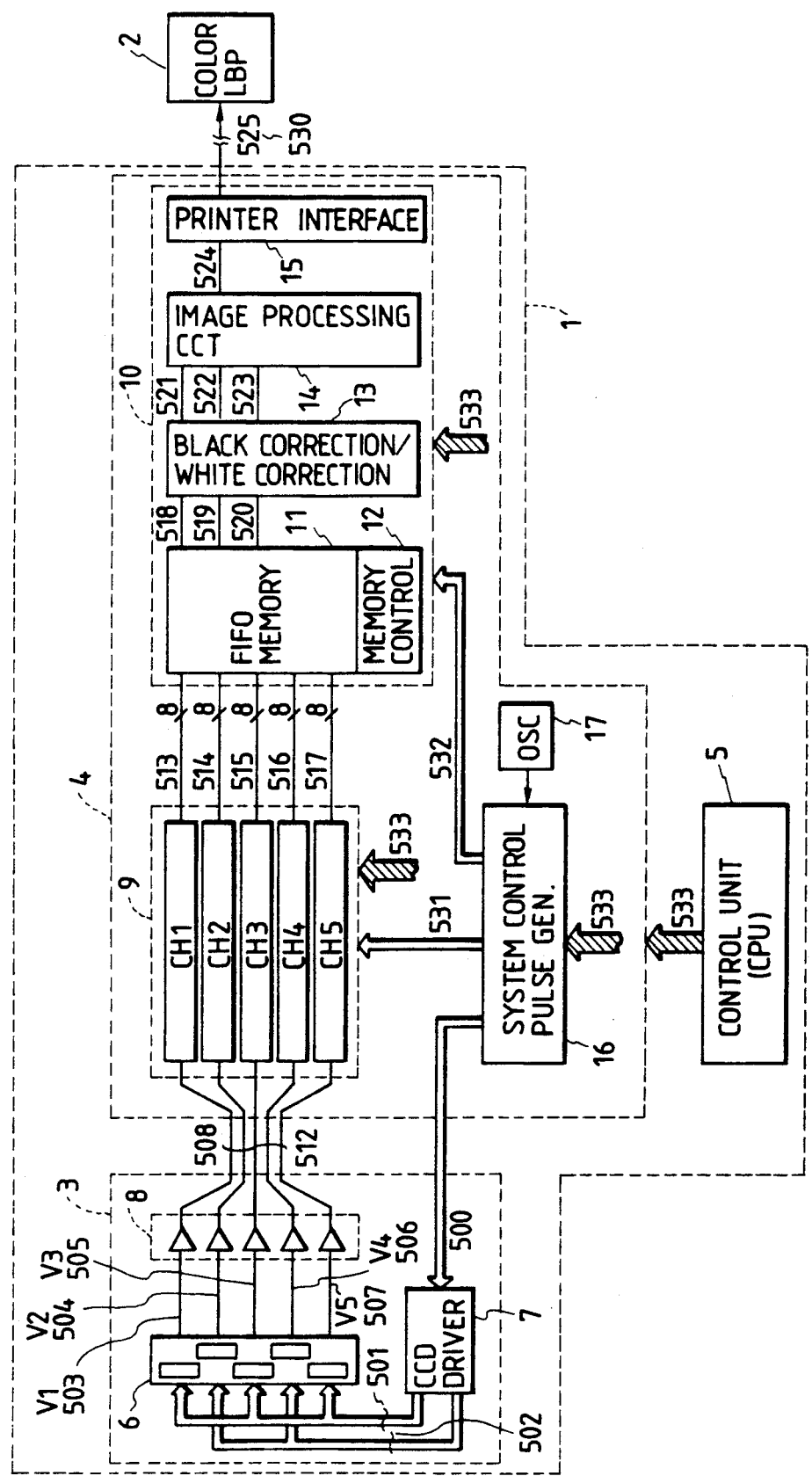
FIG. 1 is a block diagram showing the entire configuration of a video signal processing unit of a color reader according to an embodiment of the present invention.
Figure 9:
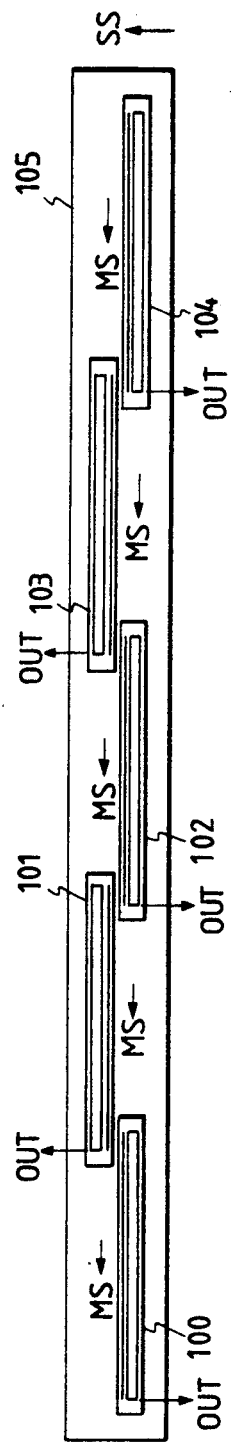
FIG. 9 is a layout drawing of a linear sensor.
Figure 10:
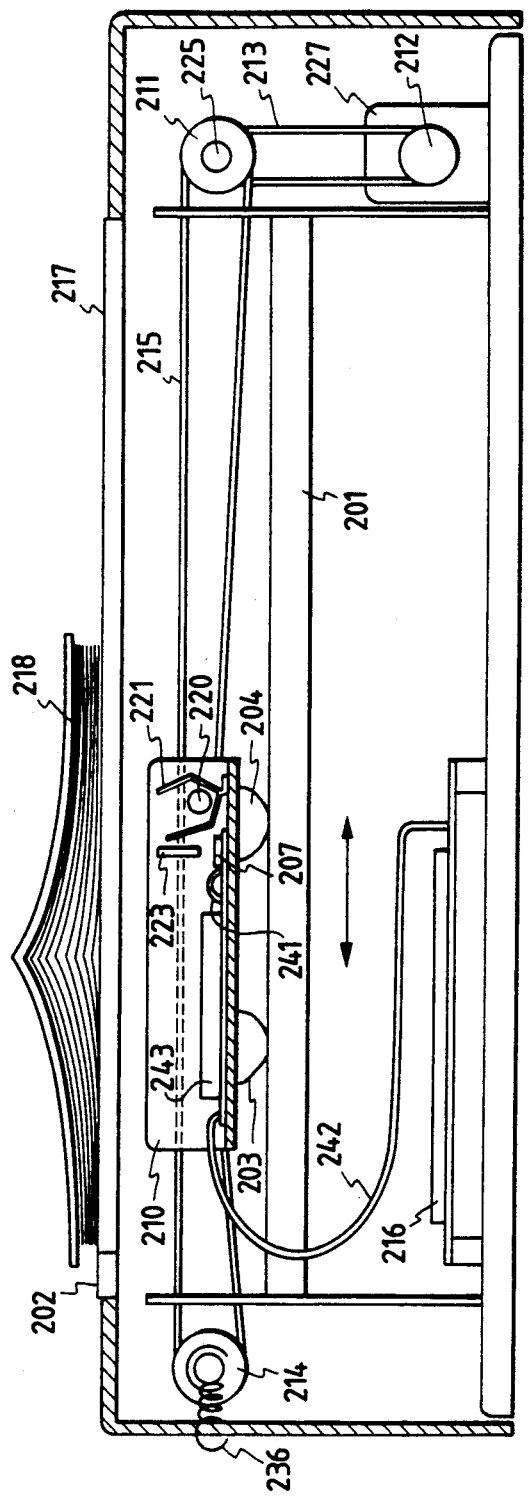
FIG. 10 is a block diagram for an original reader

FIG. 1 shows an example of a signal processing block diagram for a color image reader using a multi-chip CCD image sensor as shown in FIG. 9. An original is first irradiated by an exposure lamp, each pixel of the reflected light is color separated by a color reading sensor 6 within an original scanning unit 3 for reading, and is amplified to a specified level by an amplifier circuit (preamplifier) 8. A CCD driver 7 feeds a pulse signal to drive the color reading sensor 6, and a necessary pulse source is provided by a system control pulse generator 16.

Figure 2A:
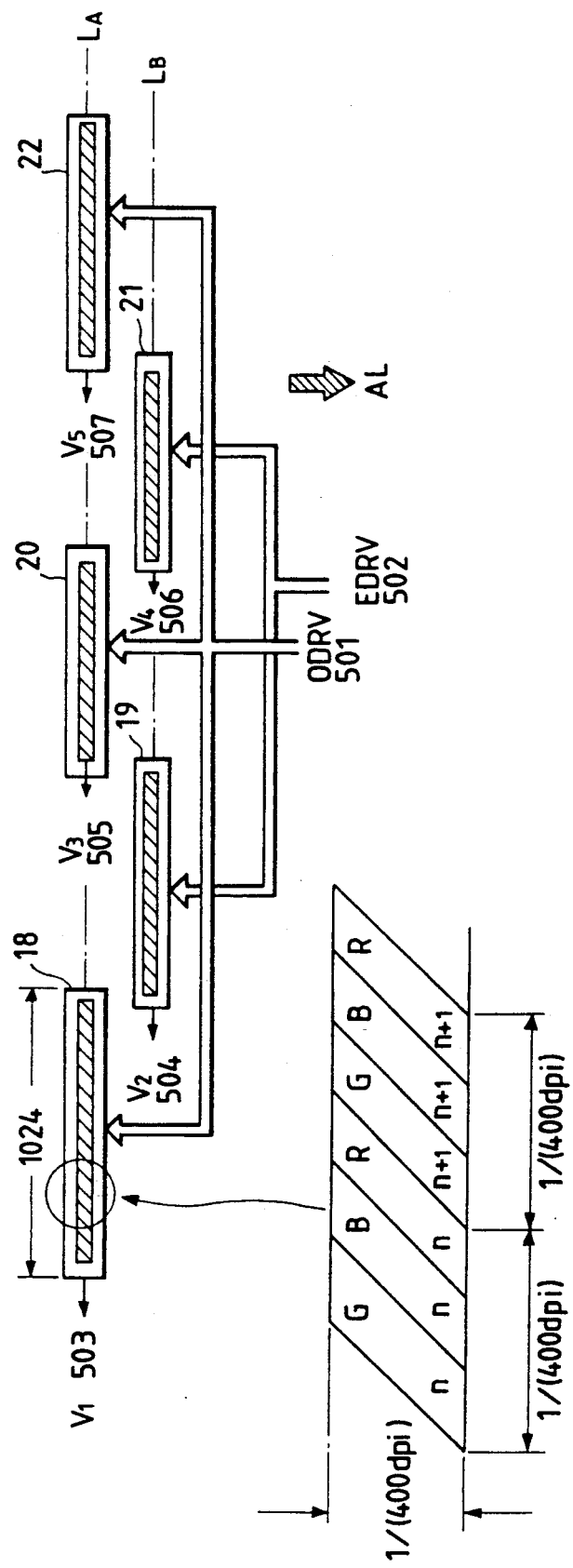
FIG. 2A is a layout drawing of a color CCD sensor in FIG. 1.

FIGS. 2A and 2B show the color reading sensor and driving pulse. FIG. 2A shows a color reading sensor used in the embodiment according to the present invention, which divides the main scanning direction into five sections for reading. Each sensor chip 18 to 22 has 960 pixels with 63.5 $\mu$m as one pixel, that is, has a number of effective pixels of $960 \times 3 = 2,880$ in total because one pixel is divided into three sections: B, G and R in the main scanning direction as shown in FIG. 2A.

On the other hand, each sensor chip 18 to 22 is formed on the same ceramic substrate. The first, third and fifth sensor chips (18, 20, 22) are allocated on the same line LA, and the second and fourth sensor chips (19, 21) are allocated on a line LB four lines (63.5 $\mu$m $\times 4 = 252$ $\mu$m) away from LA, and then are subscanned in the arrow AL direction when an original is read.

In these five sensor chips, the first, third and fifth ones are independently and synchronously driven by a driving pulse group ODRV501, and the second and fourth ones by a driving pulse group EDRV502 respectively. 0 $\Phi$ 1A, 0 $\Phi$ 2A, and ORS contained in ODRV501 and E $\Phi$ 1A, E $\Phi$ 2A, and ERS contained in EDRV502 are a charge transfer clock and a charge reset pulse within each sensor chip respectively, and are quite synchronously produced so that there is no jitter with respect to each other because of mutual interference between the first, second and third, and the second and fourth and restrictions on noise. For this reason, these pulses are produced from one reference oscillation source OSC17 (See FIG. 1).

Figure 3A:
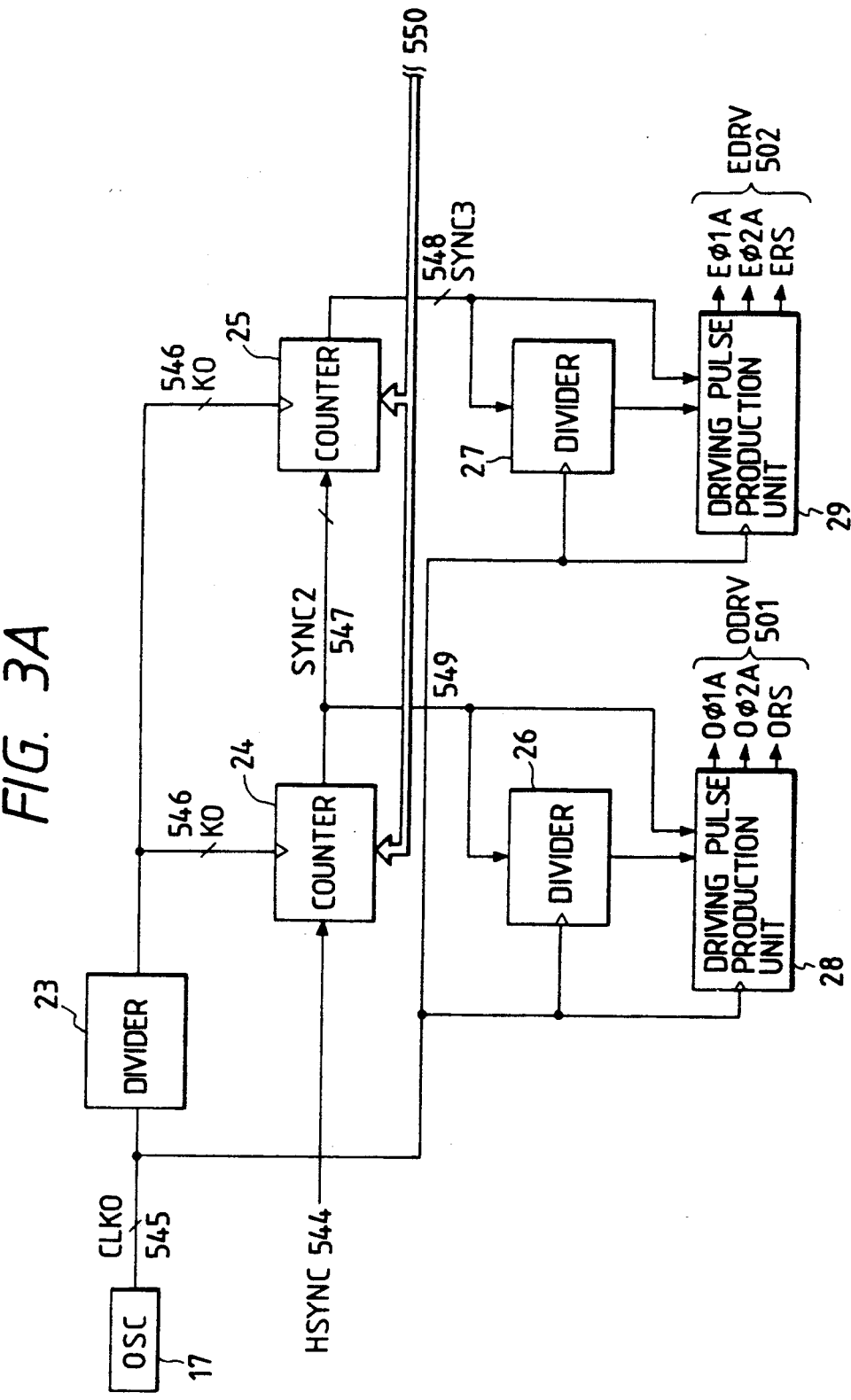
FIG. 3A is a block diagram showing the configuration of a CCD driving signal production circuit.
Figure 3B:
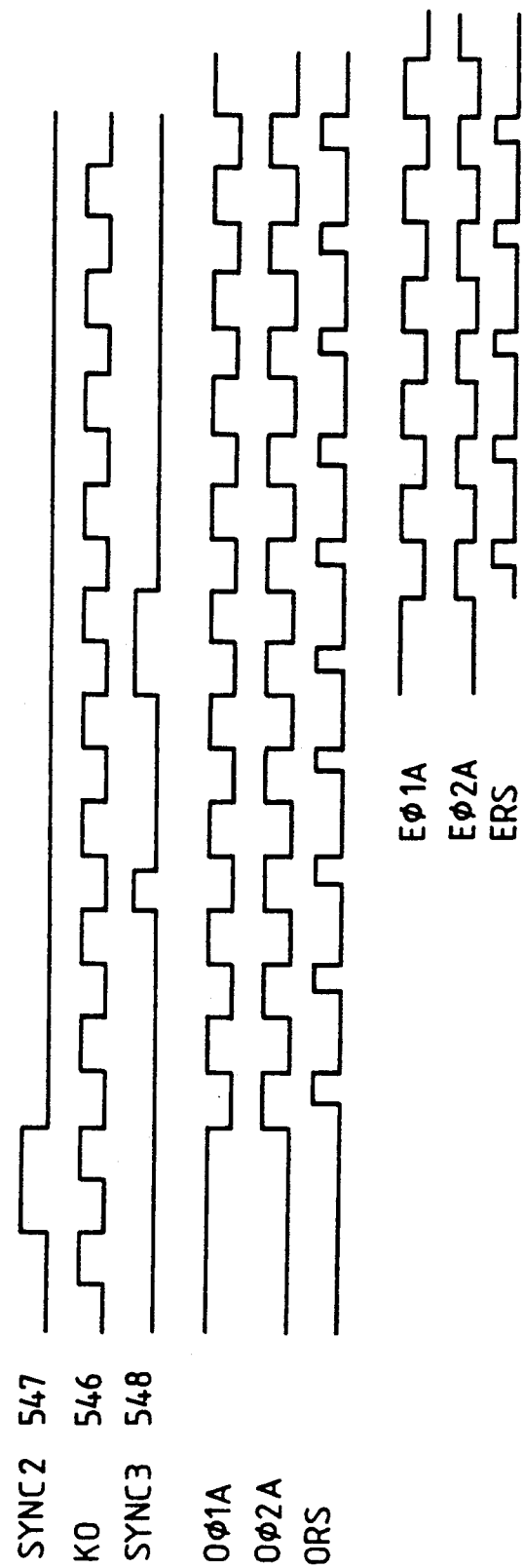
FIG. 3B is a timing chart showing the operation of the circuit in FIG. 3A.

FIG. 3A shows a circuit block diagram for producing ODRV501 and EDRV502, and FIG. 3B shows its timing chart. The circuit is included in a system control pulse generator 16 shown in FIG. 1. A clock K $\Phi$ 546 obtained by dividing an original clock CLK $\Phi$ produced from a single OSC17 produces reference signals SYNC2 and SYNC3 which determine a timing for producing ODRV and EDRV. Output timing for SYNC2 and SYNC3 is determined in accordance with preset values of presettable counters 24 and 25 which are set by a signal line 550 connected to a CPU bus. SYNC2 and SYNC3 initialize dividers 26 and 27, which operate in accordance with the CLK $\Phi$, and driving pulse production units 28 and 29.

That is, since this block is based on an input HSYNC544 and operates by means of all CLK $\Phi$, which is output from one oscillation source OSC17, and a division clock, which all synchronizes for production, each pulse group for ODRV501 and EDRV502 is obtained as a synchronous signal free from jitter to prevent turbulence in signal due to interference between sensors.

A sensor driving pulse ODRV501 obtained by synchronizing each other ODRV501 is supplied to the first, third and fifth sensor chips 18, 20 and 22, and a sensor driving pulse EDRV502 is supplied to the second and fourth sensor chips 19 and 21 through a CCD driver. Video signals V1 to V5 are independently output synchronously with the driving pulse from each sensor chip 18, 19, 20, 21 and 22, and are amplified to a specified voltage value by an independent amplifier circuit (preamplifier) 8 for each channel shown in FIG. 1. Then signals V1, V3 and V5 are sent at a timing of OOS538 shown in FIG. 2B, and signals V2 and V4 at a timing of EOS543 are sent through coaxial cable 508 to 512, and are input into a video processing unit 4.

An analog color image signal, which has been read by the above-mentioned 5-chip equimultiple type color read sensor 6, is input into an analog signal processing circuit 9 shown in FIG. 1 for each channel (each chip). Since a signal processing circuit corresponding to each channel is the same circuit, a circuit for channel 1 (ch1) will be described together with a timing chart in FIG. 6 referring to a block diagram for process shown in FIG. 5.

Figure 4:
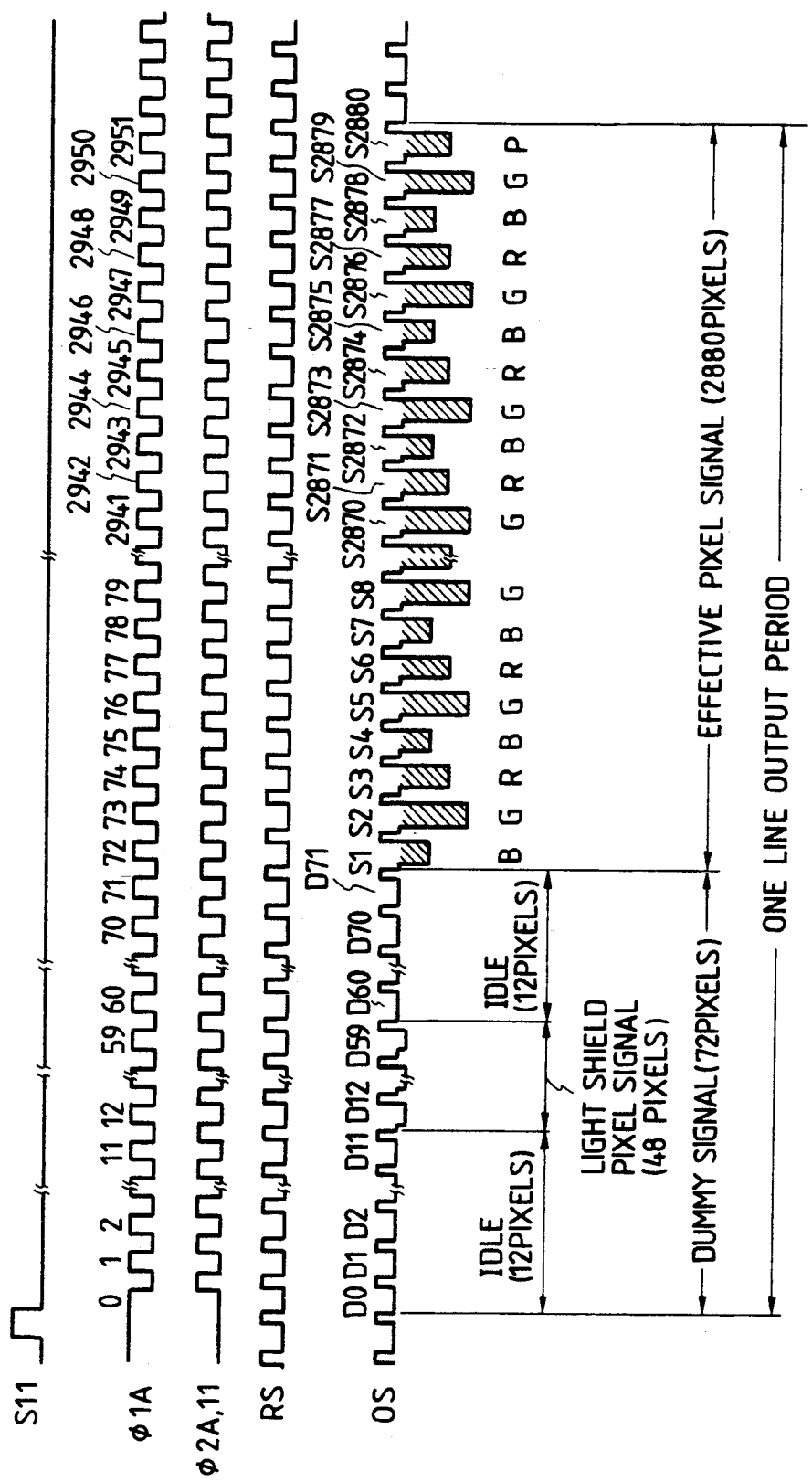
FIG. 4 is a timing charrt sowing the driving timing of the CCD image sensor in FIG. 1.
Figure 6:
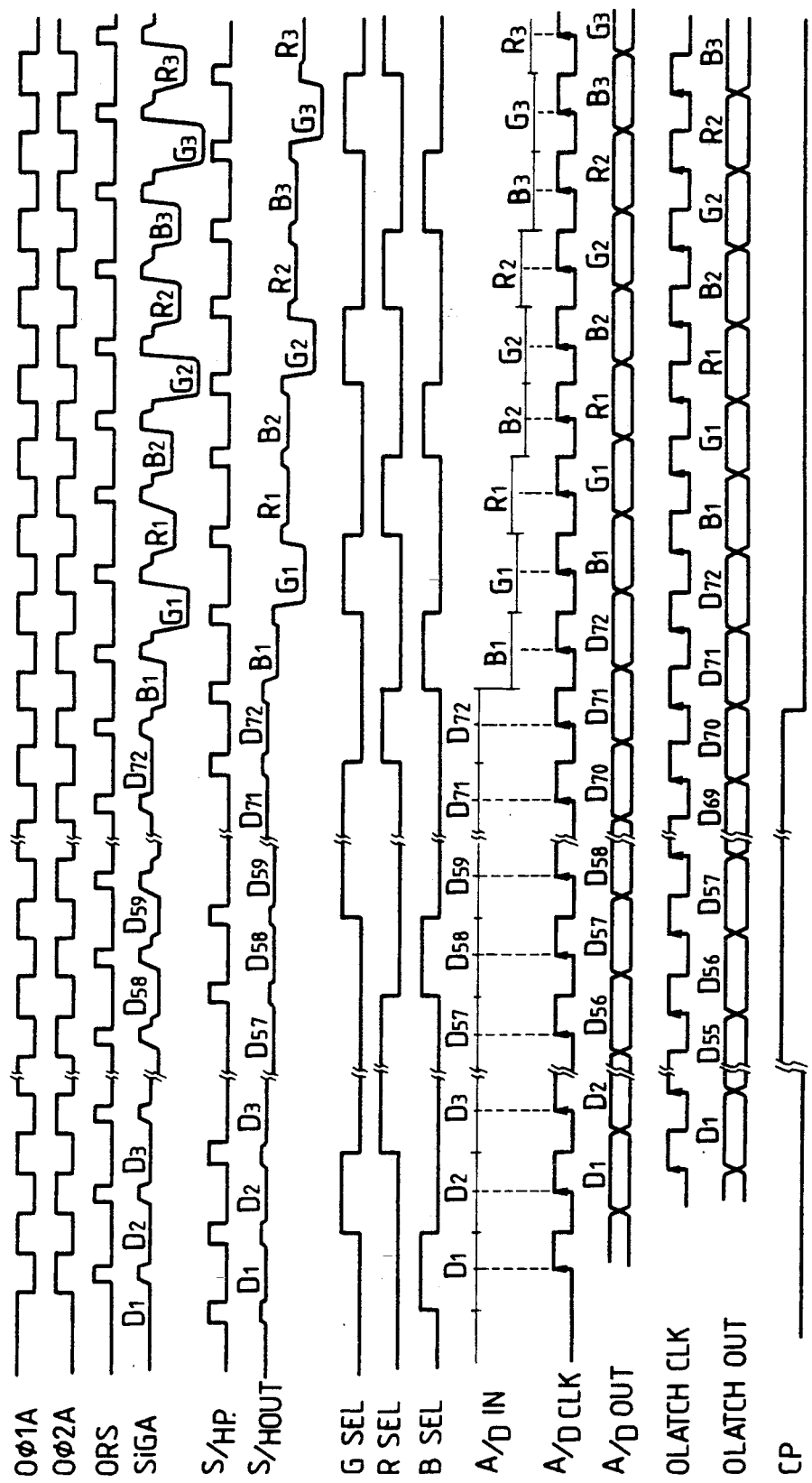
FIG. 6 is a timing chart showing the timing of signals from each portion shown in FIG. 5.

An analog color image signal is input in the order of B→G→R like SiGA shown in FIG. 6. A shift register for transfer, which each sensor chip 18 to 22 possesses, has 2,952 steps in total, and is composed of a significant part connected to a photodiode for effective pixels with 2,880 pixels, an idle transmission unit not connected to a photodiode for a color sensor with 12 pixels in front of the effective pixels, a dark output unit (optical black) shielded by aluminum on a photodiode with 48 pixels, and an idle transmission unit with 12 pixels. Accordingly, the output of each sensor chip is a composite signal consisting of 2,952 pixels in total (See FIG. 4).

An analog color image signal SiGA is input into a buffer 30 to convert it into impedance. Then, the reset of the composite signal is removed following a S/H pulse by a S/H circuit 31, and the output signal from the buffer 30 becomes a S/H output signal (S/H OUT in FIG. 6) in which a waveform distortion when driven at high speeds has been removed.

Since it includes an extraneous component at the sampling pulse frequency, the sampled/held dot sequential color signal enters a low-pass filter (LPF) 32 to remove the extraneous component. The dot sequential color signal with the extraneous sampling frequency component removed, enters an amplifier 33. To remove fluctuations in DC level of analog color signal in which the DC level fluctuates like AC the moment it is amplified to a specified signal output, it is necessary to fix the DC level of the image signal to the optimum operating point in the amplifier 33. For this purpose, a feedback clamping circuit 34 is used to clamp to zero level.

The feedback clamping circuit 34 is composed of a S/H (sample and hold) circuit 34a and a comparison amplifier 34b. The output levels of the dark output unit (optical black) for an analog color signal, which is output from the amplifier 33 over an input period for the CP signal, and of the idle transmission unit are charged by the S/H circuit 34a, and finally the idle transmission unit level is held. The idle transmission unit level is compared with a GND (ground) level, which is input into the inversion input end of the comparison amplifier 34b, and the difference is fed back to the amplifier 33. This always fixes the idle transmission unit for output from the amplifier 33 to the GND level.

A CP signal is formed by a system control pulse generator 16, and is a signal showing clamping intervals for the dark output unit and the idle transmission unit for analog color signals. Supplying this CP signal to the S/H circuit 34a allows the DC level of the idle transmission unit for analog color signals to be detected once within a horizontal scanning period (1H).

In the feedback clamping circuit 34, the zero clamping circuit when clamped at zero level has also a purpose to remove an input offset when the amplitude is variable in a dot sequential amplitude control circuit at the next stage. A signal when the idle transmission unit for an analog color signal has been clamped to zero is then input into dot sequential amplitude control circuits 35 to 39. The gain of the dot sequential color signal is adjusted for each color separation signal by the CPU control.

Figure 5:
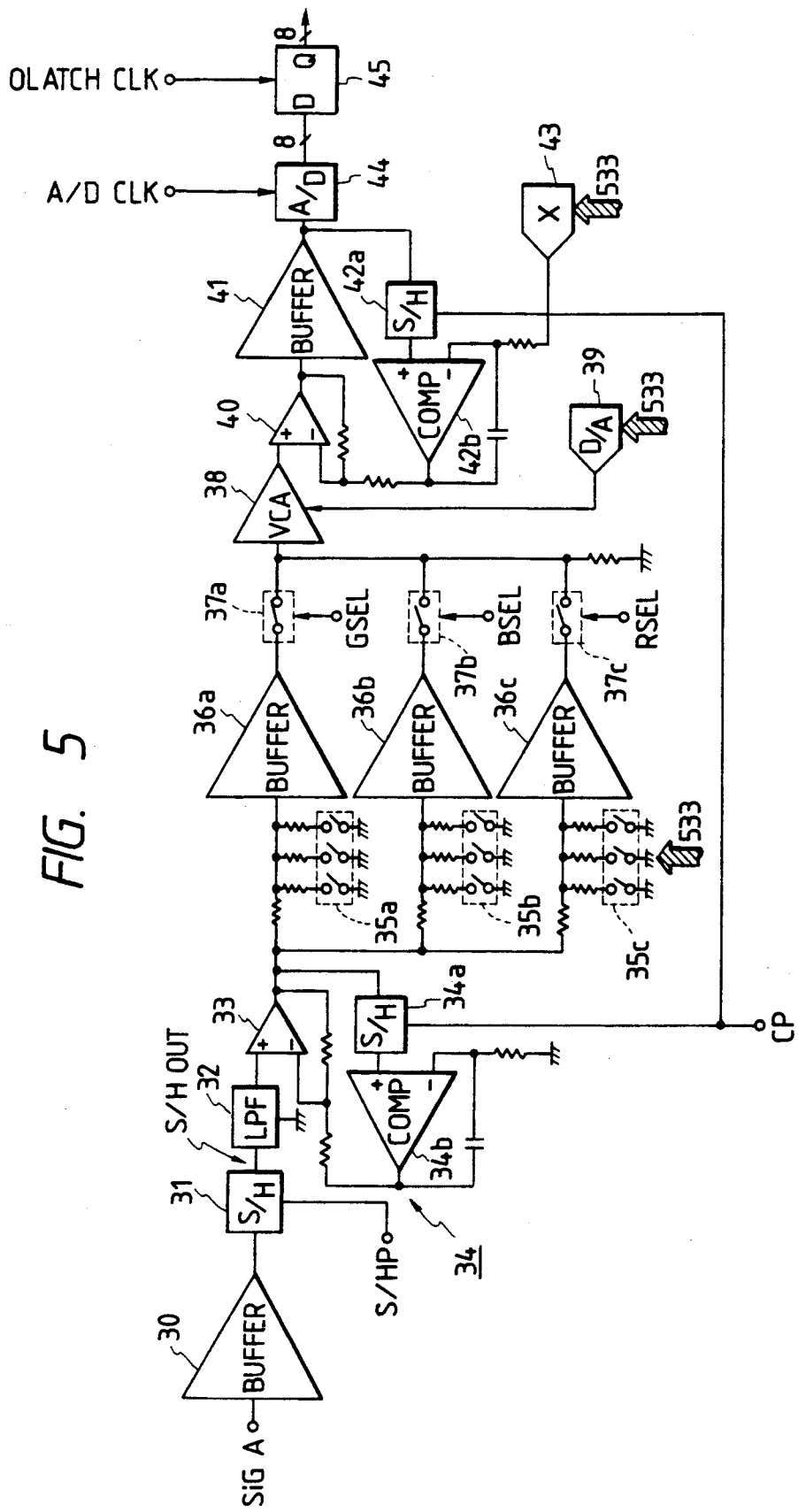
FIG. 5 is a block diagram showing a circuit configuration of an embodiment according to the present invention for one channel of an analog signal processing circuit 9 shown in FIG. 1.

Numerals 35a, 35b and 35c shown in FIG. 5 are analog switches, and data are set from the CPU through a data bus 533. A resistance partial pressure ratio of each attenuator is determined at least by a combination of analog switches. From the dot sequential signals, which have been attenuated at the respective specified partial pressure ratios, each color separation signal is taken out through buffers 36a, 36b and 36c by analog switches 37a, 37b and 37c under the control of gate signals GSEL, BSEL and RSEL.

The dot sequential signals, which have been color balanced, then enters a voltage control amplifier (VCA) 38, and a gain adjustment common to the dot sequential color signals is performed. In a D/A converter 39, the data is sent through a data bus 533 from the CPU. The output Vout from the D/A converter is as follows:

$$Vout = -Vref/N \quad 0 < N < 1$$

where N is a binary fraction value of an input digital code.

Figure 7:
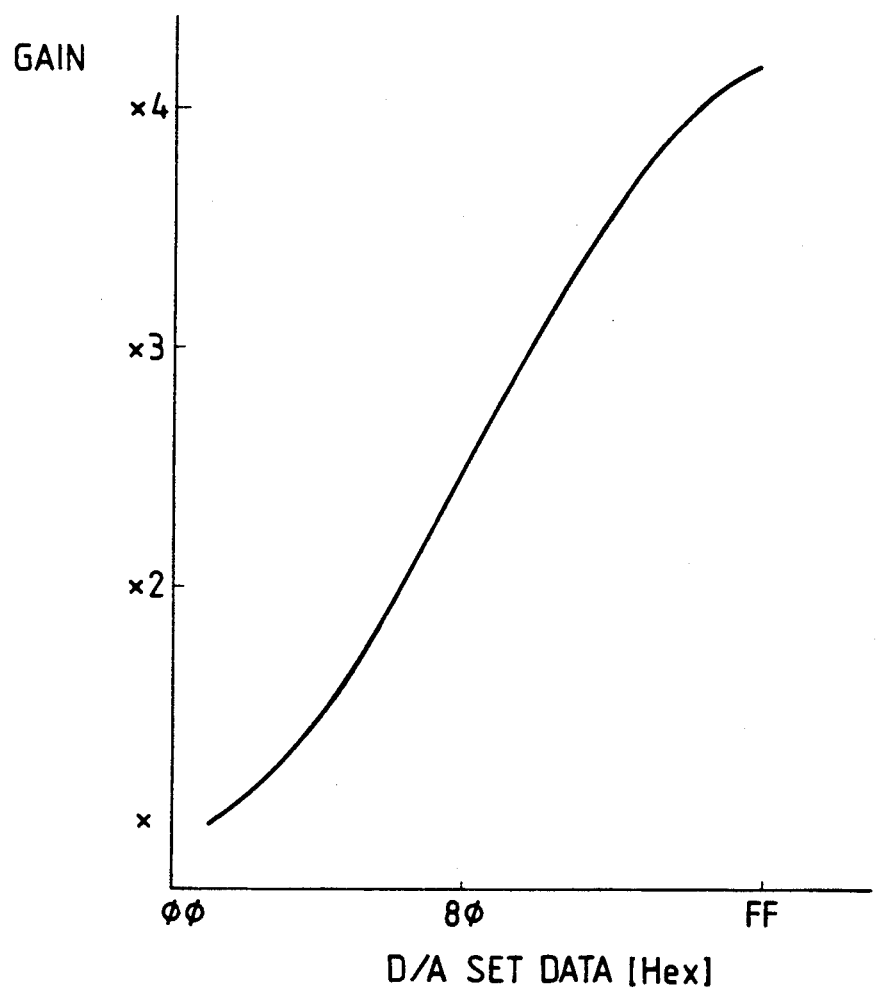
FIG. 7 is a characteristic diagram showing the voltage control type amplifier circuit in FIG. 5.

In the voltage control amplifier 38 consisting of a multiplier, the gain control input end is connected to the output end of the D/A converter 39, and a dot sequential color signal is input to the other input end. The relationship between set data and gain in the D/A converter 39 is shown in FIG. 7.

Set data for the D/A converter 39 are selected so that A/D conversion output data (R, G and B) when an original scanning unit 3 has read an uniform white plate (which corresponds to the standard white plate in FIG. 9) are the predetermined values, and the level of the dot sequential color signal is amplified according.

The analog color signal with the level controlled is then input into an amplifier 40, and is amplified to the input dynamic range of an A/D converter 44. At the same time, the DC level is controlled by the feedback clamping circuit 42 and a multiplier 43.

A feedback clamping system consisting of the multiplier 43 and the feedback clamping circuit 42 will now be described. This feedback clamping system has almost the same configuration as the feedback clamping circuit 34 at the previous stage. To obtain a reference voltage in a feedback clamping circuit consisting of the S/H circuit 42a and the comparison amplifier 42b, the multiplier 43 for controlling the CPU is connected to the feedback clamping system.

To shift the read black level image signal level in a channel connect correction process as mentioned later, the reference voltage is made variable by the multiplier 43 at a level, which is determined by digital data set to an internal latch through a data bus 533 of CPU. Then the analog color signal amplified by the amplifier 40 and the buffer 41 is clamped to the reference voltage level.

Figures 8A, 8B:
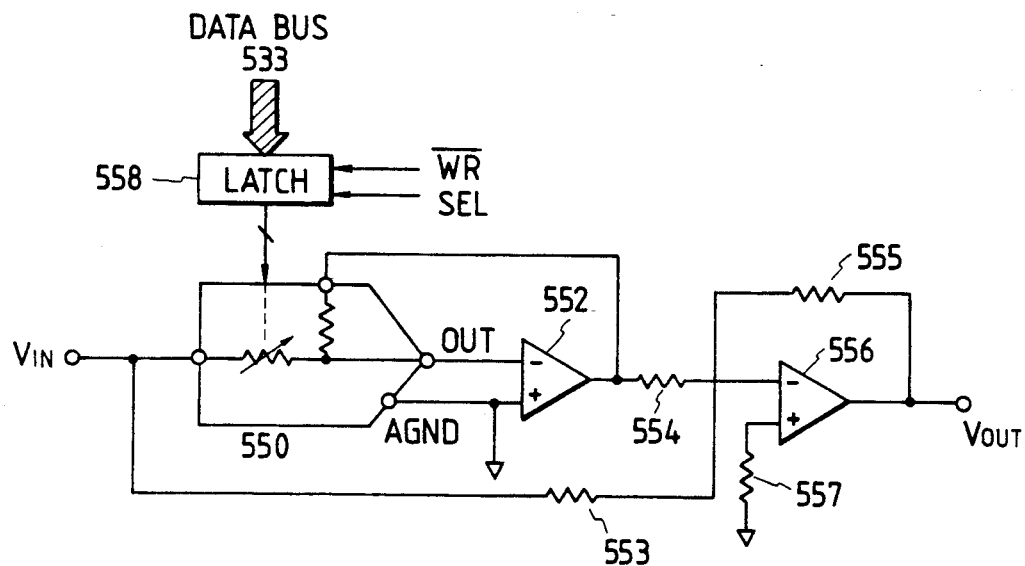
FIG. 8A is a circuit diagram showing a circuit configuration for the multiplier 43 shown in FIG. 5.
FIG. 8B is a view showing a code table showing the input and output of the multiplier 43.

The multiplier 43 is a multiplier in full-four quadrant mode composed of a multiplying D/A converter 550, operational amplifiers 552 and 556, resistances 553 and 554 of a resistance value R, and a resistance 555 of a resistance value R3 as shown in FIG. 8A, and outputs a bipolar voltage in accordance with 8-bit digital data set by the CPU as shown in FIG. 8B.

The buffer 41 is an input buffer for an A/D converter 44, and is so constructed as a high-speed buffer with a low-output impedance that the impedance is less than a reference resistance value of the A/D internal comparator at which the linearity precision of the A/D process is guaranteed by the impedance.

The dot sequential color signal, which has been amplified to a specified white level and black level and DC clamped, is input into the A/D converter 44, and becomes a digital data A/D OUT, and then enters a latch circuit 45 to mate with the digital signal processing circuit in timing, and to securely transmit digital data. The latch output data, which has been latched in an OLATCH CLK, can receive digital data at a sure timing since the latch output data is latched by a latch clock with a reverse polarity to the OLATCH CLK in the next digital signal processing circuit. Analog signal processing circuits for channels 2 to 5 are the same as above.

Then the digitized dot sequential color signals 513 to 517 for each channel to be output from an analog signal processing circuit 9 (FIG. 1) enter a digital signal processing circuit 10, and an image connection between channels is performed by a FiFo memory 11 to correct any deviation in reading positions for sensor chips 18 to 22 so that the dot sequential color signals for each channel become parallel signals (518 to 520) with continuous three colors: R, G and B for one line.

Then, each digital color signal of R, G and B enters black/white correction circuits 13. First, the black correction circuit will be described.

Black level outputs for channels 1 to 5 have great variations between chips and between pixels when the quantity of light to be input into the sensor is minute. When these are output as they are to output those images, stripes and unevenness occur on the data area of the image. Therefore it is necessary to correct the output variations in this black area.

Before the copying operation, an original scanning unit 3 is moved to the position of a black plate having a uniform density located in a non-image area at the end of an original loading stand, and a halogen lamp is bit to input the black level image signal into this circuit. This image data for one line is stored in the black level memory, and becomes a black reference value (in a black reference value take-in mode).

Assuming a number 1 of data for the black level data DK(i) to have a width in the main scanning direction and in the A4 longer direction, for example, $15.75 \times 297$ mm = 4,678 pixels/each color at 400 dpi, when five CCD chips 61 mm are arranged as one line to cover its length, i = 1 to 4,800 values can be taken corresponding to $15.75 \times 61$ mm $\times 5 = 4,800$ pixels/each color.

When reading an image, a black correction output can be obtained (in black correction mode) as Bin(i) − Dk(i) = Bout(i) for a black level data DK (i) in the case of, for example, a blue signal. The same control is similarly performed for green Gin and red Rin to provide black correction output Gout and Rout.

The white level correction (shading correction) circuit will now be described.

The white level correction is used to correct the sensitivity variations in a lighting system, an optical system and a sensor on the basis of white data generated when the original scanning unit 3 has been moved to the position of uniform white plate for irradiation. Although the white correction circuit has the same basic circuit configuration as the black correction circuit, the white correction circuit uses a multiplier for correction while the black correction circuit uses a subtracter.

When the original scanning unit 3 is placed in the position (home position) for the uniform white plate to correct the white signal, an exposure lamp is lighted and image data in uniform white level is stored in a white level memory for one line before a copying or reading operation.

Assuming that the chip has, for example, a width in the main scanning direction and in the A4 longer direction, $15.75 \times 297$ mm = 4,678 pixels at 400 dpi, when an image data for 1 chip of the CCD is composed of 960 pixels (400 dpi $\times$ 61 mm) each, $960 \times 5 = 4,800$ pixels, the capacity of the white level memory is at least 4,800 bytes, and white plate data of the "i"th pixel is assumed as W(i), i = 1 to 4,800.

On the other hand, image data after correction for a read value Din(i) for an ordinary image for "i"th pixel again W(i) is:

$$Dout(i) = Din(i) \times FFh/W(i).$$

For each color of green (G), blue (B) and red (R), white correction using the above equation is performed.

If the color balance in G, B and R signals is lost when the base film of various photographic films has been read, data is sent to analog switches 35a, 35b and 35c through the data bus 533 of the CPU again, and the color is balanced to correct white shading again.

As regards the above black level and white level corrections, refer to U.S. Pat. No. 5,038,225 in which they are described in detail.

The three-color image signals (521 to 523) with black and white corrections performed are input into an image processing circuit 14. Then the image is processed (See numeral 524 in FIG. 1) through the following circuits: a logarithmic conversion circuit for converting the brightness data into density data, a color correction circuit (input masking and output masking) for correcting the spectral properties of color separation film for a CCD sensor and the extraneous absorption characteristic for color toner (Y, M, C) to be transferred to copying paper in a color printer 2, an inking circuit, which calculates Min (Yi, Mi and Ci) (minimal value among Yi, Mi and Ci) from each color component image data Yi, Mi and Ci, and regards this an ink (black) and then adds black toner later, and the under color removal (UCR) circuit which reduces an amount to be applied of each coloring material in proportion to the applied black component.

Then, the three-color image signal is input into a printer interface 15. The interface signal is composed of a synchronizing signal (ITOP) in the image send direction (subscan direction) in addition to digital video signals, a synchronizing signal (BD) in the raster scanning direction (main scanning direction) which occurs once per raster scan, a synchronizing clock (VCLK) for sending a digital video signal to a color printer unit 2, a synchronizing signal (HSYNC) in which a VCLK free from jitter is synchronously generated based on a BD signal, and a signal (SRCOM) for half duplex two-way serial communication.

Image information and indications are sent from the reader unit to the printer unit through these signal lines, and status information in the printer unit such as jam, no paper and weight is sent from the printer unit to the reader unit.

Since a signal level is detected over a dark output unit for a dot sequential video signal to be output from photoelectric conversion means and an idle transmission unit having no photoelectric conversion device, and the detected signal level is direct-current restored at a specified potential as mentioned above, the following effects can be obtained: the level will not be affected by leakage light of the photoelectric conversion means to the dark output unit, but it will be possible to properly control the density level between each channel when an image sensor consisting of a plurality of chips is used irrespective of any density state of an original image.

The present invention has been described referring to preferred embodiments above, but is not limited to these embodiments, and can, of course, be embodied by modifying the described structures in various ways within the scope of the claims.

I claim:

1. An image reading apparatus comprising:
    a plurality of linear sensor means for reading an image of an original, each of said linear sensor means including a plurality of photodiodes and a transfer shift register, said shift register outputting an image signal from a portion thereof connected to said plurality of photodiodes and outputting a dummy signal from a portion thereof unconnected to said plurality of photodiodes;
    detecting means for detecting a level of the dummy signal output from each of said linear sensor means; and
    controlling means for controlling a level of said image signal output from each of said linear sensor means in accordance with the level of the dummy signal detected by said detecting means.

2. Apparatus according to claim 1, wherein said detecting means detects the level of the dummy signal for each line.

3. Apparatus according to claim 1, wherein said controlling means controls the level of the image signal so that a black level of the image signal is the level of the dummy signal.

4. Apparatus according to claim 1, wherein said plurality of linear sensor means read a color image of the original.

5. Apparatus according to claim 1, wherein each of said linear sensor means reads a different portion of the original in a divided manner.

6. Apparatus according to claim 1, wherein a quantity of each of said detecting means and said control means is equal to that of said linear sensor means.

7. Image reading apparatus, comprising:
    linear sensor means for reading a color image of an original, said linear sensor means having a plurality of photodiodes and a transfer shift register, said shift register outputting a plurality of color image signals from a portion thereof unconnected to said plurality of photodiodes and outputting a dummy signal from a portion thereof unconnected to said plurality of photodiodes;
    detecting means for detecting a level of the dummy signal output from said linear sensor means; and
    controlling means for controlling a level of each of said plurality of color image signals output from said linear sensor means in accordance with a level of the dummy signal detected by said detecting means.

8. Apparatus according to claim 7 wherein said detecting means detects the level of the dummy signal for each line.

9. Apparatus according to claim 7, wherein said controlling means controls the level of the image signal so that a black level of the image signal is the level of the dummy signal.

10. An image reading apparatus, comprising:
    a plurality of linear sensor means for reading a color image of an original, each of said linear sensor means including a plurality of photodiodes and a transfer shift register, said shift register outputting a plurality of color image signals from a portion thereof connected to the photodiodes and outputting a dummy signal from a portion thereof unconnected to the photodiodes;
    detecting means for detecting a level of the dummy signal outputted from each of said linear sensor means; and
    controlling means for controlling a level of each of said color image signals outputted from each of said linear sensor means in accordance with a level of the dummy signal detected by said detecting means.

11. Apparatus according to claim 10, wherein said detecting means detects a level of the dummy signal for each line.

12. Apparatus according to claim 10, wherein said controlling means controls a level of the image signal so that a black level of the image signal is a level of the dummy signal.

13. Apparatus according to claim 10, wherein each of said linear sensor means reads a different portion of the original in a divided manner.

14. Apparatus according to claim 10, wherein a quantity of each of said detecting means and said controlling means is equal to that of said linear sensor means.

* * * * *

UNITED STATES PATENT AND TRADEMARK OFFICE
CERTIFICATE OF CORRECTION

PATENT NO. : 5,153,929
DATED : October 6, 1992
INVENTOR(S) : ITAGAKI

It is certified that error appears in the above-identified patent and that said Letters Patent is hereby corrected as shown below:

COLUMN 3

Line 32, "charrt sowing" should read --chart showing--.
Line 47, "reader" should read --reader.--.
Line 52, "will" should read --will be--.

COLUMN 6

Line 46, "channel connect" should read --channel-connect--.
Line 48, "level," should read --level--.

COLUMN 10

Line 10, "claim 7" should read --claim 7,--.

Signed and Sealed this

Thirtieth Day of March, 1993

Attest:

STEPHEN G. KUNIN

Attesting Officer

Acting Commissioner of Patents and Trademarks